Patented Mar. 8, 1927.

1,619,852

UNITED STATES PATENT OFFICE.

EMILE CONTI, OF ALFORTVILLE, FRANCE.

SOLDER FOR ALUMINUM AND ITS ALLOYS.

No Drawing. Application filed September 12, 1924, Serial No. 737,380, and in France July 21, 1924.

This invention relates to a solder intended for soldering aluminum and its alloys, and is characterized by the fact that no previous cleaning or scraping is required, the soldering being effected in a perfect manner without the necessity of heating the parts to be soldered to a high temperature.

The solder in question is obtained by fusing or melting together tin, zinc and cadmium in determined proportions.

The proportions of each of the above mentioned metals may vary according to the following proportions.

52 to 66% tin.
46 to 23% zinc.
2 to 11% cadmium.

The fused mixture of these metals has added to it a certain quantity of chloride of sodium, sal ammoniac and alum, or of only one or other of these materials.

Athough the product obtained enables soldering to be effected at a very low temperature, the constituents of the solder penetrate and associate with the molecules of the aluminum forming a very strong soldered connection.

The resistance of the solder is greater than that of aluminum, and when exposed to traction, to compression or to torsion it is the metal which breaks.

This solder does away with riveting, whence there is considerable economy in the manufacture of all articles of aluminum.

What I claim and desire to secure by Letters Patent in the United States of America is:—

A solder for aluminum and its alloys containing from about 52 to 66% of tin; 46 to 23% of zinc and 2 to 11% cadmium, with the addition of a relatively small proportion (from 1 to 5%) of chloride of sodium, sal ammoniac and alum.

In witness whereof I affix my signature.

EMILE CONTI.